United States Patent
Christena et al.

[15] 3,676,424
[45] July 11, 1972

[54] AZIRIDINE SALTS OF DIBASIC ACIDS

[72] Inventors: Ray C. Christena, Wichita; Earnest L. Johnston, Clearwater, both of Kans.

[73] Assignee: Vulcan Materials Company, Birmingham, Ala.

[22] Filed: Aug. 31, 1970

[21] Appl. No.: 68,493

[52] U.S. Cl..........................260/239 E, 156/331, 161/233, 260/31.6, 260/75 N
[51] Int. Cl. ..............................................C07d 45/00
[58] Field of Search..............................260/239 E

[56] References Cited

OTHER PUBLICATIONS

Dermer et al., " Ethylenimine and Other Aziridines," (Academic Press, 1969), pages 109–113.

Primary Examiner—Alton D. Rollins
Attorney—Burns, Doane, Swecker & Mathis

[57] ABSTRACT

An aziridine salt of the formula:

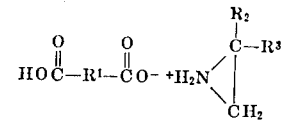

wherein:
  $R^1$ is alkylene, arylene, or aralkylene, wherein one or all of the hydrogen atoms thereof can be substituted with F, Cl, Br, lower alkyl and/or lower alkoxy; and
  $R^2$ and $R^3$ are hydrogen, alkyl, or aryl.

Process for producing polyesteramides by reacting the above salt with a polycarboxylic acid and a polyhydric alcohol are described.

11 Claims, No Drawings

AZIRIDINE SALTS OF DIBASIC ACIDS

CROSS REFERENCE TO RELATED APPLICATIONS

The aziridine salts claimed herein and the processes claimed herein can be employed to produce polyesteramides which are claimed in my application entitled "Polyesteramides," Ser. No. 68,492, filed concurrently herewith.

This invention relates to aziridine salts of Formula I:

(I)
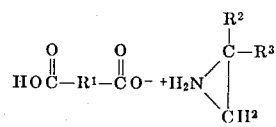

wherein:
$R^1$ is alkylene, arylene, or aralkylene, wherein one or all of the hydrogen atoms thereof can be substituted with one or more members selected from the group consisting of F, Cl, Br, lower alkyl, and lower alkoxy; and
$R^2$ and $R^3$ are independently selected from the group consisting of hydrogen, alkyl, and aryl.

In one preferred embodiment of the present invention, $R^1$ is lower alkylene or phenylene, $R^2$ is hydrogen or methyl and $R^3$ is hydrogen.

In another preferred embodiment of the present invention wherein the salts are especially useful to produce flame retardant polyesteramides as described more completely below, $R^1$ is tetrachlorophenylene, tetrabromophenylene, or a radical of Formula II:

(II)
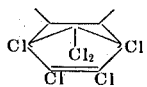

by which is meant the residue of 1,4,5,6,7,7-hexachlorobicyclo[2.2.1]-5-heptene-2,3-dicarboxylic acid commercially available as Chlorendic acid or Het acid. In this embodiment $R^2$ is hydrogen or methyl and $R^3$ is hydrogen.

The salts of Formula I are produced by co-reacting a dicarboxylic acid of Formula III:

(III)
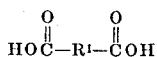

with an aziridine compound of Formula IV:

(IV)
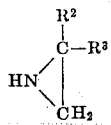

wherein $R^1$, $R^2$ and $R^3$ have the above described meanings. The reaction is most conveniently effected by simply adding the aziridine compound to the acid at any convenient temperature, but generally between −20° C. and 100° C. and preferably between 0° C. and 50° C. At lower temperatures, the reaction proceeds at an uneconomically slow rate whereas at higher temperatures the salt tends to rearrange to an amino ester or hydroxy amide. The reaction is preferably conducted in the presence of a suitable solvent which is inert to the acid and the aziridine compound. Examples of suitable solvents include among others ethanol, methanol, and acetone, which is preferred. The solvent can be present in any amount up to infinite dilution. The aziridine is preferably added to the acid in a molar ratio of 10:10 although slightly varying molar ratios such as 10:11 to 11:10 can also be employed. At lower molar ratios insufficient aziridine is present in order to completely convert the acid to the salt of Formula I whereas at greater ratios competing side reactions occur undesirably reducing the yield of the salt.

The acids of Formula III should be free of non-benzenoid unsaturation, in order to inhibit undesirable reactions with the aziridine compound. For example, maleic acid is not within the scope of acids of Formula III.

Unlike many reactions employing dicarboxylic acids, in this reaction the acid anhydrides are not equivalents and the term "acid" employed in connection with the acids of Formula I is meant to refer to the acid containing two carboxyl groups and not to the corresponding anhydride. Examples of suitable acids of Formula III include among others malonic acid, succinic acid glutaric acid, adipic acid, azelaic acid, brassylic acid, phthalic acid, terephthalic acid, isophthalic acid, 1,8-naphthalenedicarboxylic acid, araliphatic dicarboxylic acids such as p,p'benzophenonedicarboxylic acid, and 3-methyl phthalic acid, hemipinic acid, 3-bromophthalic acid, 4-chloroisophthalic acid, tetrabromophthalic acid, tetrachlorophthalic acid, and chlorendic acid.

Examples of suitable aziridine compounds include among others ethylene imine (aziridine), 2-methyl aziridine, 2-phenyl aziridine, 2,2-dimethyl aziridine, 2-benzyl aziridine and 2-dodecyl aziridine. Ethylene imine is preferred because of cost, availability, and reactivity, although 2-methyl aziridine has also been found to be suitable for certain specialized applications.

According to another aspect of the present invention there is provided an improved process for producing polyesteramides comprising co-reacting a salt of Formula I with a polyhydric alcohol and either a polycarboxylic acid or polycarboxylic acid anhydride.

In the broadest aspects of the present invention any polycarboxylic acid or anhydride can be employed. However, dicarboxylic acids and anhydrides are preferred when it is desired to produce linear polyesteramides. Examples of certain dicarboxylic acids free of non-benzenoid unsaturation are given above. Their corresponding anhydrides such as phthalic anhydride can also be employed. In an especially preferred embodiment of the present invention, the dicarboxylic acid or anhydride is alpha-beta ethylenically unsaturated in order to render the polyesteramide cross-linkable with a vinyl monomer. Examples of suitable alpha-beta unsaturated dicarboxylic acids include among others glutaconic acid, itaconic acid, citraconic acid, mesaconic acid, fumaric acid and maleic acid which is preferred. Tri- or higher functional acids such as trimesic acid can be employed when it is desired to produce a branched or cross-linked polyesteramide.

In the broadest aspects of the present invention, any polyhydric alcohol can be employed although the dihydric alcohols are preferred when it is desired to produce linear polyesteramides.

Examples of suitable polyhydric alcohols include among others ethylene glycol, diethylene glycol, 1,2-propylene glycol, dipropylene glycol, 1,3-propylene glycol, 1,3-butylene glycol, 1,2-butylene glycol, neopentyl glycol, 1,3-pentanediol, 1,2-butenediol, and 1,5-pentanediol. Higher polyhydric alcohols such as trimethylol propane and pentaerythritol can be used in minor amounts which do not materially alter the linear nature of the polyesteramide.

The polyesteramides are simply produced by combining the coreactants in a reaction vessel and heating it to any temperature above which the reaction proceeds at an economical rate and below which degradation of the reactants occur. This is generally between 0° C. and 200° C. and preferably between 40° C. and 180° C. When it is desired to achieve a high molecular weight, the ratio of the polycarboxylic acid to the polyhydric alcohol is critical and generally is between 15:10 and 10:15 and preferably between 11:10 and 10:11. Since the salt of Formula I does not change the stoichiometry of the reaction, it can be employed in somewhat more widely varying molar ratios, but is generally present in a molar ratio of 10:1 to 1:10 and preferably 3:1 to 1:3 moles of salt per mole of polycarboxylic acid of Formula III. In that preferred embodiment of the present invention wherein the polyesteramides are intended to be self-extinguishing a salt of a chlorinated or brominated acid is employed in an amount such that the total polyesteramide or its mixture with a vinyl monomer has a halogen content of greater than 10 weight per cent and preferably greater than 20 weight per cent. The reactants can be charged sequentially to the vessel but are preferably charged simultaneously in order to produce a random polyesteramide. The reaction is continued until a stoichiometric amount of water has been removed or more preferably until the acid number of the reaction mixture has dropped to a value below 100 and preferably below 50 and also until the amine number of the reaction mixture has dropped to a value below 20 and preferably below 10.

Polyesteramides produced in accordance with that preferred embodiment of the present invention employing an alpha-beta ethylenically unsaturated acid can be cross-linked with copolymerizable vinyl monomers. Examples of suitable vinyl monomers include among others vinyl toluene, acrylic acid, methylacrylate, 2-ethylhexyl acrylate, acrylonitrile, methyl methacrylate, n-butyl acrylate, monochloro styrene, ethyl acrylate, ethyl methacrylate, acrolein, vinyl acetate, vinylidene chloride, vinyl chloride, vinyl bromide and styrene which is preferred.

Polyesteramides produced in accordance with the present invention either alone or in admixture with a vinyl monomer find utility as adhesives and as binders for fiberglas laminates, in view of their wetting ability and exceptional adhesion. They can also be used in coatings.

"Amine Number" is used herein to refer to the value determined as follows:

Weigh out 1 to 2 g of polyesteramide in a 200 ml Erlenmeyer flask. Add approximately 50 ml glacial acetic acid and dissolve sample. Titrate with 0.1 N $HClO_4$ using one drop of 1 percent crystal violet in glacial acetic acid as indicator. Titrate to first permanent green color.

Amine Number = 10.046 (ml 0.1 N $HClO_4$)/Grams Sample

"Acid Number" is used herein to refer to the value determined as follows:

Weigh out 1 to 2 g of polyesteramide in a 200 ml Erlenmeyer flask with 25 ml acetone. Titrate with 0.1 N Alcoholic KOH using phenolphthalein indicator.

Acid Number = 5.61 (ml 0.1 N Alcoholic KOH)/Grams Sample

The invention is further illustrated by the following examples in which parts and percentages are by weight unless otherwise indicated. These non-limiting examples are illustrative of certain embodiments designed to teach those skilled in the art how to practice the invention and to represent the best mode contemplated for carrying out the invention.

EXAMPLE I

This example illustrates the synthesis of a salt of Formula V:

(V)
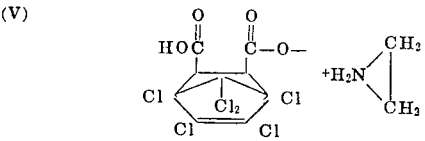

To a 3-neck, 2-liter flask equipped with stirrer, thermometer, dropping funnel, and cooling bath was added 388.87 g (1.00 mole) of chlorendic acid in 1,200 ml very dry acetone. To the above was added 43.07 g (1.00 mole) of ethylenimine dropwise at such a rate that the temperature was 16°–20° C. When about half the ethylenimine was added, the solid salt started to precipitate out. After all evidence of exotherm disappeared, the solids were filtered off and air dried at room temperature in a hood, followed by drying in a vacuum oven at ambient temperature to give a white solid, m.p. 149°–150° C. yield 98.9 percent.

| Amine equivalent | calcd. for $C_{11}H_9Cl_6NO_4$: | 431.91 |
|---|---|---|
| | found: | 434 |
| Carboxyl equivalent | calcd. for $C_{11}H_9Cl_6NO_4$: | 215.95 |
| | found: | 213 |

The salt was stored at 5° C. to prevent gradual rearrangement to the mono-2-aminoethyl chlorendate.

EXAMPLE II

This example illustrates the synthesis of a slat of Formula VI.

(VI)
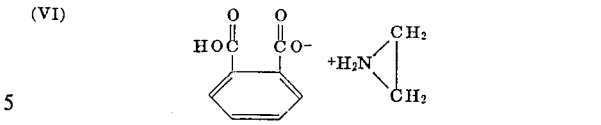

Using equipment as in Example I, 332.3 g (2 moles) phthalic acid and 2,900 ml very dry acetone were charged to a pot. To this was added 86.1 g (2 moles) ethylenimine, dropwise at 16°–20 C. The reaction mixture was filtered to give a white solid after air and vacuum drying, at ambient temperature m.p. 94°–95° C., yield 95.7 percent.

| Amine equivalent | calcd. for $C_{10}H_{11}NO_4$: | 209.20 |
|---|---|---|
| | found: | 210.50 |
| Carboxyl equivalent | calcd. for $C_{10}H_{11}NO_4$: | 104.60 |
| | found: | 102.40 |

EXAMPLE III

This example illustrates the synthesis of a salt of Formula VII.

(VII)
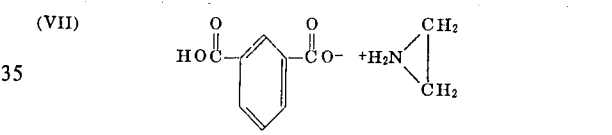

Using equipment as in Example I, 332.3 g (2 moles) of isophthalic acid was mixed with 2,500 ml dry acetone and 500 ml dry methanol. To this was added 86.1 g (2 moles) ethylenimine dropwise at 16°–20° C. The reaction mixture was filtered to give a white solid after ambient temperature air and vacuum drying, m.p. 100°–160° C.

| Amine equivalent | calcd. for $C_{10}H_{11}NO_4$: | 209.20 |
|---|---|---|
| | found: | 209.20 |
| Carboxyl equivalent | calcd. for $C_{10}H_{11}NO_4$: | 104.60 |
| | found: | 107.40 |

The above salt contained a substantial amount of impurities due to poor solubility of isophthalic acid in the acetone methanol mixture as indicated by large melting point range.

EXAMPLE IV

This example illustrates the synthesis of a salt of Formula VIII.

(VIII)
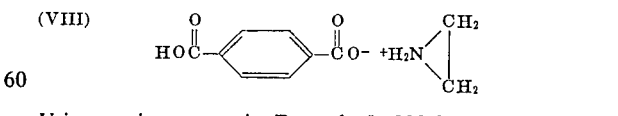

Using equipment as in Example I, 332.3 g (2 moles) of terephthalic acid was slurried with 2,500 ml dry acetone and 500 ml dry methanol. To this was added 86.1 g (2 moles) ethylenimine, dropwise at 16°–20° C. The reaction mixture was filtered to give a white solid after ambient temperature air and vacuum drying, m.p. 184°–210° C.

| Amine equivalent | calcd. for $C_{10}H_{11}NO_4$: | 209.20 |
|---|---|---|
| | found: | 234.9 |
| Carboxyl equivalent | calcd. for $C_{10}H_{11}NO_4$: | 104.60 |
| | found: | 109.20 |

The above salt contained a substantial amount of impurities due to poor solubility of the acid in the acetone-methanol mixture as indicated by the large melting point range.

EXAMPLE V

This example illustrates the synthesis of a salt of Formula IX.

(IX) 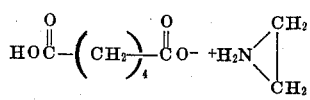

Using equipment as in Example I, 77.24 g (0.52 mole) adipic acid was dissolved in 600 ml dry acetone. To this was added 22.76 g (0.52 mole) ethylenimine, dropwise at 17°–23° C. The reaction mixture was filtered to give a white solid after ambient temperature air and vacuum drying, m.p. 68.5°–69.0° C., yield 94.4 percent.

| Amine equivalent | calcd. for $C_8H_{15}NO_4$: | 189.21 |
|---|---|---|
| | found: | 196.85 |
| Carboxyl equivalent | calcd. for $C_8H_{15}NO_4$: | 94.60 |
| | found: | 96.65 |

EXAMPLE VI

This example illustrates the synthesis of a salt of Formula X.

(X) 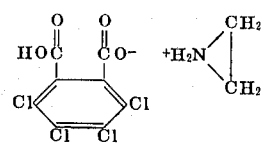

Using equipment as in Example I, 312.93 g (1 mole) of tetrachlorophthalic acid hemihydrate was dissolved in 1,750 ml dry acetone. To this was added 43.07 g (1 mole) ethylenimine, dropwise at 17°–20° C. The reaction mixture was filtered to give a white solid after ambient temperature air and vacuum drying, m.p. 120°–124° C.

| Amine equivalent | calcd. for $C_{10}H_8NO_{4.5}$: | 356.0 |
|---|---|---|
| | found: | 352.0 |
| Carboxyl equivalent | calcd. for $C_{10}H_8NO_{4.5}$: | 178.0 |
| | found: | 187.5 |

EXAMPLE VII

This example illustrates the synthesis of a salt of Formula XI.

(XI) 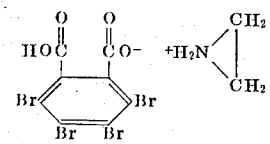

The procedure of Example VI is repeated employing the same conditions, times and ingredients except that the tetrachlorophthalic acid hemihydrate is replaced by an equimolar amount of tetrabromophthalic acid hemihydrate.

EXAMPLE VIII

Preparation of a Polyesteramide Using the Mono Salt of

Chlorendic Acid and Ethylenimine

Preparation of the polyesteramide was accomplished in a conventional reactor equipped with thermometer, stirrer, full condenser, partial condenser to contain glycol vapors, nitrogen sparge and source of vacuum.

The procedure used to prepare the polyesteramide was to charge the salt and maleic anhydride to the reactor along with xylene as an azeotroping agent. Heating resulted in reaction of the solid salt with maleic anhydride as evidenced by a rapid exotherm after which stage all materials were in liquid form. This first phase of the reaction was followed by determination of the amine number defined as milligrams of perchloric acid per gram of sample. When the amine number was very low (3–5), the glycol was charged to the reactor, the temperature further elevated, and water was azeotropically distilled over as the reaction proceeded. This second phase was followed by determination of acid numbers. The reaction was run until acid number approached 25 to 50. At this point, vacuum was applied to remove excess glycol, remaining water and xylene. After this, vacuum was removed, inhibitor was added, the product was cooled and styrene was added to give a 60–70 percent solution of the polyesteramide in styrene. The final liquid product could be cured to a solid at elevated temperature using a free radical curing agent such as benzoyl peroxide or at room temperature using cobalt napthenate and methyl ethyl ketone peroxide.

A specific example follows: To the reactor, using a nitrogen blanket, was charged 566.56 g (1.31 moles) of the chlorendic acid-ethylenimine salt along with 128.64 g (1.31 moles) of maleic anhydride in 360 ml xylene. Heating was started and the temperature rose to 123° C. over a 50-minute period with exotherming. Continued heating for another hour increased the temperature to 137° C. resulting in an amine number of 3.0. At this point, 56 mg (50 ppm) of mono-tertiary butyl hydroquinone (MTBHQ) was added and 104.8 g (1.38 moles) of propylene glycol was charged to the reactor. Heating was continued for another 1.5 hours until the temperature rose to 155° C., resulting in an acid number of 55 and an amine number of 2.3. Vacuum (34 mm) was applied and any remaining water, excess glycol, or xylene were distilled over resulting in an amine number of 3.4 and an acid number of 37. The vacuum was removed, 224 mg (200 ppm) of toluhydroquinone (THQ) was added and the reaction product cooled to 112° C. at which point 357 g of styrene was added to make a 68 percent solution of the polyesteramide in styrene. The final product was filtered resulting in a light orange colored liquid.

EXAMPLE IX

Preparation of a Polyesteramide Using the Mono Salt of

Phthalic Acid and Ethylenimine

This polyesteramide was made using a different anhydride-glycol mole ratio and also different order of addition of reactants than in Example VIII.

To a reactor, as in Example VIII, was charged 50 ml xylene, 168.16 g (1.58 moles) diethylene glycol, 157.84 g (0.75 mole) phthalic acid-ethylenimine salt, 74.00 g (0.75 mole) maleic anhydride and 55 mg (100 ppm) 2,6-di-tert-butyl-4-methylphenol antioxidant. Using a nitrogen blanket, the reactor was heated to 110° C. over a 40-minute period at which time the reaction mixture was a light yellow liquid. Continued heating to 178° C. over a 3-hour period resulted in a material having an acid number of 39.9. Vacuum (35 mm) was applied and the remaining water, glycol, and xylene were distilled over. Vacuum was removed, the polyesteramide was cooled to 95° C., 110 mg (200 ppm) Shell Ionol added, and 182 ml styrene added to yield a 69.6 percent solids solution of the polyesteramide in styrene. Final acid number was 23 and the amine number was 8.

EXAMPLE X

Preparation of Polyesteramide Using the Mono Salt of

Adipic Acid and Ethylenimine

To a reactor, as in Example VIII, was charged 90.24 g (1.19 moles) propylene glycol, 50 ml xylene, 204.04 g (1.08 moles) of adipic acid-ethylenimine salt, and 105.72 g (1.08 moles) maleic anhydride. Using a nitrogen blanket, the reactor was heated to 120° C. with exotherming over a 30-minute period. Heating was continued to 168° C. over a 2.5-hour period. Vacuum (35 mm) was applied and the remaining glycol, water, and xylene distilled over. The vacuum was removed, the pot cooled to 105° C., 58 mg (100 ppm) toluhydroquinone (THQ), and 193 ml styrene added to yield a 68 percent solids solution of the polyesteramide in styrene. Final acid number was below 56. The styrene adequately dissolved the polyesteramide at 105° C. but partially separated on cooling.

EXAMPLE XI

Preparation of Polyesteramide Using the Mono Salt of Tetrachlorophthalic Acid and Ethylenimine To a reactor, as in Example VIII, was charged 59.84 g (0.79 mole) propylene glycol, 250 ml xylene, 266.72 g (0.75 mole) of the tetrachlorophthalic acid-ethylenimine salt, and 73.44 g (0.75 mole) maleic anhydride. Using a nitrogen blanket, the reactor was heated to 150° C. over a 4-hour period at which point the acid number was 50. One gram of PbO was added as a catalyst and heating continued for 3.5 hours with temperature rise to 172° C. while under vacuum (28 mm). Vacuum was removed, the reaction mixture was cooled to 130° C., 58 mg toluhydroquinone (THQ) added, and cooling continued to 100° C. Styrene (172 ml) was added to yield a 70 percent solids solution of the polyesteramide in styrene.

EXAMPLE XII

Preparation of Polyesteramide Using Mono Salt of Chlorendic Acid and Ethylenimine and Neopentyl Glycol To a reactor, as in Example VIII, was charged 250 ml xylene, 92.04 g (0.94 mole) of maleic anhydride, 8.3 g of tris (2-chloroethyl) phosphite and 405.36 g (0.94 mole) of the mono salt of chlorendic acid and ethylenimine. Using a nitrogen blanket, the reactor was heated to 116° C., with exotherming over a 0.75-hour period at which stage all reactants were in liquid form. Continued heating to 132° C. over a 3-hour period resulted in a product with an amine number of 2.1. At this point, 102.60 g (0.98 mole) of 96 percent neopentyl glycol was added to the reactor. Continued heating to 153°C. over a 2.3-hour period resulted in a product with an acid number of 50. Vacuum (3–6 mm) was applied and any excess water, glycol or xylene distilled off. The vacuum was removed and the product cooled to 135° C. Mono tertiary butylhydroquinone 30 mg (50 ppm) was added at 135° C. At 115°C, 120 mg (200 ppm) toluhydroquinone was added. At 108° C, 271 ml of styrene was added to yield a 70 percent solids solution of the polyesteramide in styrene.

EXAMPLE XIII

Preparation of Polyesteramide Using Mono Salt of Chlorendic Acid and Ethylenimine and Ethylene Glycol To a reactor, as in Example VIII, was charged 40 ml xylene, 57 mg (100 ppm) tertiary butyl catechol (TBC), 64.28 g (1.04 moles) ethylene glycol, 46.76 g (0.22 mole) trimethylol propane diallyl ether and 53.48 g (0.55 mole) maleic anhydride. Using a nitrogen blanket the reactor was heated to 96° C. over a 0.8-hour period. At this point, 235.48 g (0.55 mole) of the chlorendic acid-ethylenimine salt was added. Exotherming started and heating was continued until the temperature rose to 137° C. over a 2.5-hour period where the acid number was 43. Vacuum (42 mm) was applied and any excess water, glycol, ether, or xylene was distilled off. The vacuum was removed and the product cooled to 68° C. TBC 114 mg (200 ppm) plus 188 ml of styrene was added to yield a 67.2 percent solids solution of the polyesteramide in styrene. Final acid number was 28 and the amine number was 4.9.

EXAMPLE XIV

Preparation of Polyesteramide Using Mono Salt of Chlorendic Acid and Ethylenimine and 2-Butene-1,4-Diol To a reactor, as in Example VIII, was charged 250 ml xylene, 8.3 g tris (2-chloroethyl) phosphite, 94.56 g (0.96 mole) maleic anhydride and 416.32 g (0.96 mole) chlorendic acid-ethylenimine salt. Using a nitrogen blanket, the reactor was heated with exotherming to 118° C. over a one-hour period where all reactants were in liquid form. Continued heating to 133° C. over a 3.3-hour period gave a product with an amine number of 3.8. Butenediol 89.16 g (1.01 moles) was added. Further heating to 153° C. over a 2.1-hour period yielded a product with acid number of 52. Pressure was reduced to 23 mm Hg and any excess water, glycol, or xylene was distilled off. After restoring atmospheric pressure the product was cooled to 140° C. where 63 mg (75 ppm) mono tertiary butyl hydroquinone was added. At 120° C., 211 mg (250 ppm) toluhydroquinone was added. At 112° C., 269 ml styrene was added yielding a 70 percent solids solution of polyesteramide in styrene.

EXAMPLE XV

Fiber Glass Laminates Made with Polyesteramides

The polyesteramide made in Example VIII was used as the binder in 12 × 12 × 1/8-inch fiber glass laminates. One laminate (NO. 1was made using 12 plies of type 181 glass cloth treated with methacrylato chromic chloride in isopropanol (DuPont's Volan A). Another laminate (No. 2) was made using 12 plies of untreated type 181 glass cloth. A third laminate (No. 3)was made with 12 plies of Volan A treated type 181 glass cloth using a polyester resin made of equivalent amounts of chlorendic acid as compared to the chlorendic acid-ethylenimine salt used in the first two laminates. Data on the three laminates follows:

| Laminate | Tensile strength, p.s.i. | Modulus, p.s.i. | Resin content, percent | Chlorine content, percent | | Cloth |
|---|---|---|---|---|---|---|
| | | | | Resin | Laminate | |
| #1 | 35,381 | 2.95×10⁶ | 43.34 | 25.80 | 11.18 | Treated. |
| #2 | 42,124 | 2.69×10⁶ | 42.49 | 25.80 | 10.96 | Untreated. |
| #3 | 40,163 | 3.08×10⁶ | 40.60 | 25.18 | 10.22 | Treated. |

It has been observed in our work that qualitatively polyesteramides have good adhesion to glass. Polyesters do not have good adhesion except to specially treated glass coated with a coupling agent such as Du Pont's Volan A. Comparison of laminates No. 1, No. 2, and No. 3 shows that tensile properties are approximately the same and that addition of the amide group is not deleterious.

The laminates were prepared by the hand lay-up method. Curing of the resin was accomplished with 2.5 percent Lupersol DDM initiator (60 percent methyl ethyl ketone peroxide in dimethyl phthalate) and 0.3 percent "Uversol Cobalt Liquid 6 Percent." Curing was effected at room temperature in a press at 460 psi for 16 hours, followed by a post cure for 8 hours in an oven at 150° F.

Fiber glass laminates were also made from resins made with pthalic acid-ethylenimine salt and also neopentyl glycol.

EXAMPLE XVI

This comparative example illustrates the synthesis of the ethylenimine salt of oxalic acid of Formula XII:

(XII) 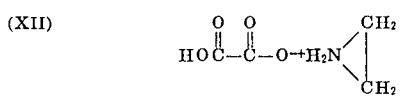

The preparation of the salt of Formula XII has been known since before the turn of the century and is described in 28 Berichte 2929 (1895).

Using the general procedure of Example I, 270.12 grams (3.00 moles) anhydrous oxalic acid was dissolved in 3,000 ml dry acetone. To this solution was added 129.2 grams (3.00 moles) ethylenimine dropwise at 15°–19° C. After complete reaction, the solid reaction product was filtered off and dried at room temperature in a hood to give a white solid, mp 102°–103.5° C. with foaming, in a 98.2 percent yield.

| Amine equivalent | calculated for | $C_4H_7NO_4$ | 133.11 |
| --- | --- | --- | --- |
| | found | | 134.10 |
| Carboxyl equivalent | calculated for | $C_4H_7NO_4$ | 66.55 |
| | found | | 73.13 |

EXAMPLE XVII

This comparative example illustrates the synthesis of a polyesteramide using the salt of Formula XII. This polyesteramide has the undesirable property of being insoluble in styrene.

To a reactor described in Example VIII, the reactants were charged as in Example X. The charge consisted of 205.04 grams (1.54 moles) of the salt of Formula XII, 151.04 grams (1.54 moles) of maleic anhydride, 123.04 grams (1.62 moles) propylene glycol and 250 ml xylene. Using a nitrogen blanket the reactor was heated to 119° C. with exothermy over a 90-minute period. Heating was continued to 155° C. over a 3-hour period, at which time vacuum (6mm Hg) was applied and the remaining glycol, water and xylene distilled over. After 45 minutes the vacuum was removed and provisions were made to transfer the molten polyesteramide into a styrene solution containing 140 mg toluhydroquinone (200 ppm THQ). Upon attempting to dissolve the polyesteramide in styrene it was found that the polyesteramide was totally insoluble in styrene at all temperatures up to 120° C. At this temperature attempts to effect solution were terminated.

The insolubility of this polyesteramide in styrene renders it useless in the preparation of styrene cross-linkable polyesteramides.

Although the invention has been described in considerable detail with reference to certain preferred embodiments thereof, it will be understood that variations and modifications can be effected within the spirit and scope of the invention as described above and as defined in the appended claims.

What is claimed is:

1. A salt of the formula:

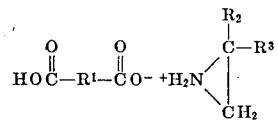

wherein:
  $R^1$ is free of non-benzenoid unsaturation and is selected from the group consisting of alkylene of up to 13 carbon atoms, arylene of up to 12 carbon atoms, and aralkylene of up to 13 carbon atoms, wherein one or all of the hydrogen atoms thereof can be substituted with one or more members selected from the group consisting of F, Cl, Br, lower alkyl and lower alkoxy; and
  $R^2$ and $R^3$ are independently selected from the group consisting of hydrogen, alkyl of from one to 12 carbon atoms, phenyl, and benzyl.

2. A salt of claim 1 of the formula:

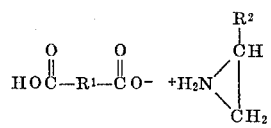

wherein:
  $R^1$ is phenylene; and
  $R^2$ is hydrogen or methyl.

3. A salt of the formula:

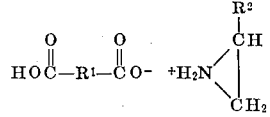

wherein:

$R^1$ is tetrachlorophenylene, tetrabromophenylene

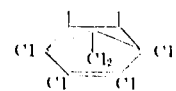

$R^2$ is hydrogen or methyl.

4. A salt of the formula:

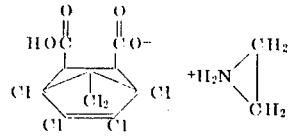

5. A salt of claim 1 of the formula:

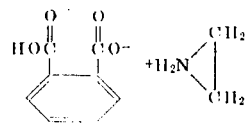

6. A salt of claim 1 of the formula:

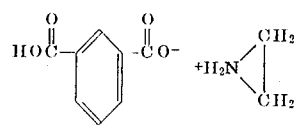

7. A salt of claim 1 of the formula:

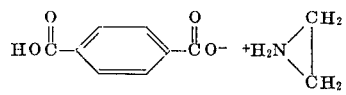

8. A salt of the formula:

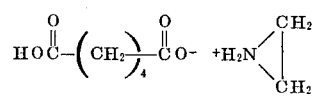

9. A salt of claim 1 of the formula:

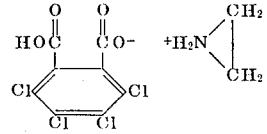

10. A salt of claim 1 of the formula:

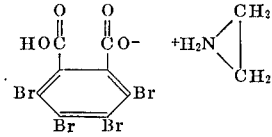

11. A salt of claim 1 of the formula:

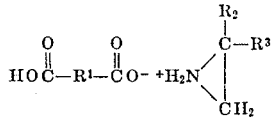

wherein:
  $R^1$ is phenylene, naphthalenylene, or benzophenonylene, wherein one or all of the hydrogen atoms thereof can be substituted with one or more members selected from the group consisting of F, Cl, Br, lower alkyl and lower alkoxy; and
  $R^2$ and $R^3$ are independently selected from the group consisting of hydrogen, alkyl of from one to 12 carbon atoms, phenyl, and benzyl.

* * * * *

UNITED STATES PATENT OFFICE
CERTIFICATE OF CORRECTION

Patent No. 3,676,424              Dated July 11, 1972

Inventor(s) Ray C. Christena and Earnest L. Johnston

It is certified that error appears in the above-identified patent and that said Letters Patent are hereby corrected as shown below:

IN THE CLAIMS

Column 10, line 1, after "tetrabromophenylene" insert -- or -- .

Column 10, after the formula at line 5, insert -- and -- .

Signed and sealed this 17th day of October 1972.

(SEAL)
Attest:

EDWARD M. FLETCHER, JR.             ROBERT GOTTSCHALK
Attesting Officer                     Commissioner of Patents